J. PHILLIPS & T. J. GRIFFITH.
HARROW.

No. 173,334. Patented Feb. 8, 1876.

WITNESSES

INVENTORS
James Phillips.
Thomas J. Griffith.

ATTORNEYS.

UNITED STATES PATENT OFFICE.

JAMES PHILLIPS AND THOMAS J. GRIFFITH, OF THORNTOWN, INDIANA.

IMPROVEMENT IN HARROWS.

Specification forming part of Letters Patent No. 173,334, dated February 8, 1876; application filed January 8, 1876.

*To all whom it may concern:*

Be it known that we, JAMES PHILLIPS and THOMAS J. GRIFFITH, of Thorntown, in the county of Boone and State of Indiana, have invented a new and valuable Improvement in Harrows; and we do hereby declare that the following is a full, clear, and exact description of the construction and operation of the same, reference being had to the annexed drawings making a part of this specification and to the letters and figures of reference marked thereon.

Figure 1:
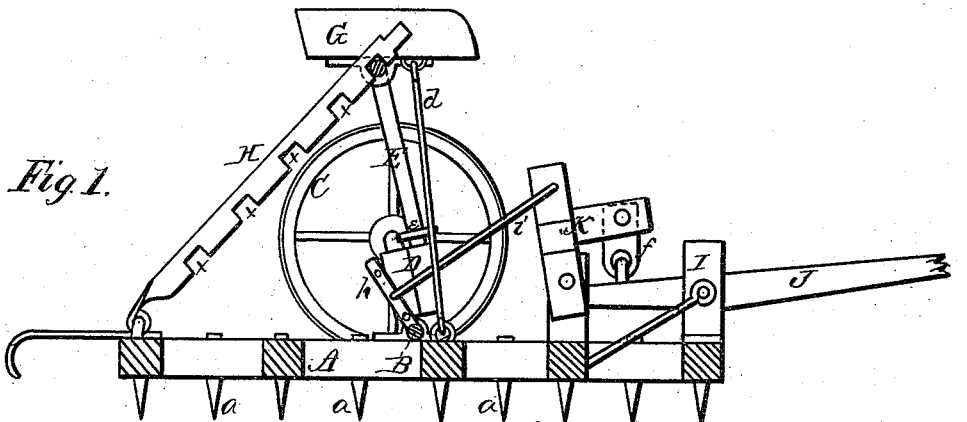
Figure 2:
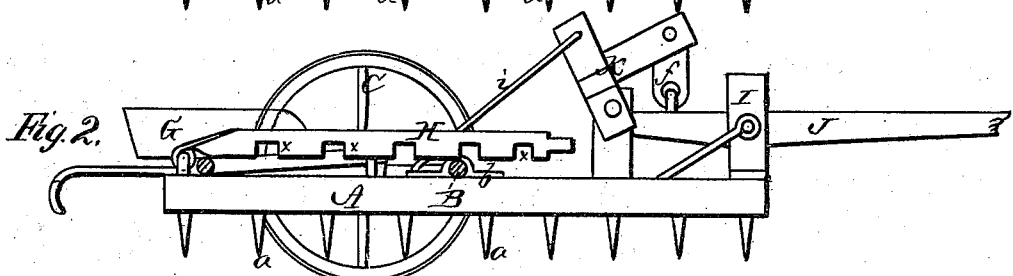
Figure 3:
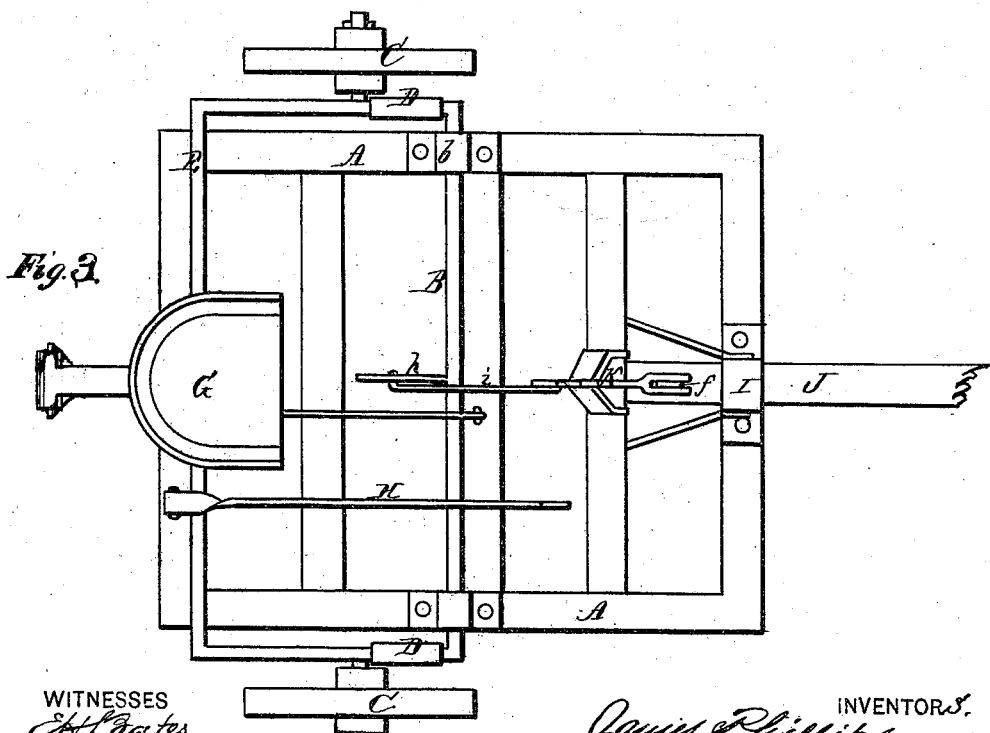

Figure 1 of the drawings is a representation of a longitudinal vertical section of our harrow, and Fig. 2 is a side view thereof. Fig. 3 is a plan view of the same.

My invention relates to that class of harrows which are mounted on wheels; and it consists in the construction and general arrangement of the harrow hung upon a crooked axle having a wheel upon each end; an arched lever attached to the ends of the axle and supporting a pivoted seat with a notched brace for holding the harrow at any height; devices for connecting the axle and the tongue; and in the combination of parts, as will be hereinafter more fully set forth.

In the annexed drawing, A represents the rectangular harrow-frame, provided with teeth $a\ a$, and suspended, by means of boxes $b\ b$, from an axle, B, having its ends bent in crank form, with the wheels C C placed upon their outer ends. Upon that portion of the axle at each end which stands at right angles with the main part is placed a double sleeve, D, one tube of which receives the end of an arched lever, E, extending across from side to side of the machine. Near each end of this lever is a stop or collar, $e$, which rests on the axle, as shown, thus supporting the lever thereon. On the center of the lever E is pivoted the seat G for the driver, and on the rear portion of the frame A is hinged a brace, H, provided with a series of notches, $x\ x$, to catch on and support the arched lever E at any desired height.

It will be seen that the weight of the driver balances the harrow, and when the brace H is thrown away from the lever E said lever and driver's seat G will be down upon the rear part of the harrow-frame, or, in other words, the bent axle will be so turned as to raise the harrow entirely up from the ground.

To lower the harrow the driver will simply rise from his seat and throw the brace H forward against the lever E, so as to catch thereon, and then seat himself again, the wheels C C being then entirely up from the ground. The seat G may then be further supported by a brace-rod, $d$, as shown.

J is the tongue pivoted in a bail, I, on the front of the frame A, and the rear end of said tongue is, by a link, $f$, lever $k$, and rod $i$, connected with an arm, $h$, on the axle B, whereby said tongue is made to conform to the movement of the axle and harrow-frame, so that its front end will be at the same height, whether the harrow is up or down.

What we claim as new, and desire to secure by Letters Patent, is—

1. The combination, with the harrow-frame A, crank-axle B, and wheels C C, of the lever E, connected to the axle by the double sleeves D D, the seat G, and notched brace H, all constructed and arranged to operate substantially as and for the purposes herein set forth.

2. The combination of the harrow-frame A and crank-axle B with arm $h$, the pivoted tongue J, and connections $f\ k\ i$, substantially as and for the purposes herein set forth.

In testimony that we claim the above we have hereunto subscribed our names in the presence of two witnesses.

JAMES PHILLIPS.
THOMAS J. GRIFFITH.

Witnesses:
FRANKLIN MACY,
OLIVER CRAVEN.